United States Patent
Tatsuta et al.

[11] Patent Number: 6,024,130
[45] Date of Patent: Feb. 15, 2000

[54] SYNTHETIC RESIN PIPE

[75] Inventors: Yoshiaki Tatsuta; Yoshihisa Tateishi, both of Osaka, Japan

[73] Assignee: Totaku Industries, Inc., Osaka, Japan

[21] Appl. No.: 09/083,050

[22] Filed: May 22, 1998

[30]   Foreign Application Priority Data

May 26, 1997   [JP]   Japan .................................. 9-152880

[51] Int. Cl.[7] .................................................. F16L 9/127
[52] U.S. Cl. .......................... 138/121; 138/110; 138/155; 138/177
[58] Field of Search ................................. 138/110, 120, 138/121, 122, 155, 177

[56]   References Cited

U.S. PATENT DOCUMENTS

| | | | |
|---|---|---|---|
| 2,146,352 | 2/1939 | Rohrer | 138/155 |
| 2,397,655 | 4/1946 | Francis | 138/177 |
| 3,076,669 | 2/1963 | Schlein | 138/121 |
| 3,603,905 | 9/1971 | Schuttloffel | 138/121 |
| 3,693,664 | 9/1972 | Schmunk | 138/155 |
| 5,664,606 | 9/1997 | Anderson | 138/119 |
| 5,792,532 | 8/1998 | Pfleger | 138/121 |
| 5,799,703 | 9/1998 | Kanao et al. | 138/121 |
| 5,832,960 | 11/1998 | Amatsutsu et al. | 138/121 |
| 5,839,477 | 11/1998 | Murayama | 138/120 |
| 5,939,160 | 8/1999 | Kline et al. | 138/118 |

FOREIGN PATENT DOCUMENTS

| | | |
|---|---|---|
| 0 727 606 A1 | 2/1996 | European Pat. Off. . |
| 2 104 617 | 8/1982 | United Kingdom . |

*Primary Examiner*—Andres Kashnikow
*Assistant Examiner*—James F. Hook
*Attorney, Agent, or Firm*—Whitham, Curtis & Whitham

[57]   ABSTRACT

A pipe having a substantially square cross section portion and a substantially circular cross section portion are disposed alternately in the axial direction of the pipe. The thickness of the circular portion is set uneven in the circumferential direction. In particular, the thickness of the portions of the circular portion that correspond to the corner portions of the square portion is set larger than the thickness of the portions that correspond to the central portions of the respective sides of the square portions. Accordingly, a pipe having corner portions with increased pressure deformation resistance is obtained. Also, the pipe is capable of being manufactured in a high efficiency manner.

12 Claims, 8 Drawing Sheets

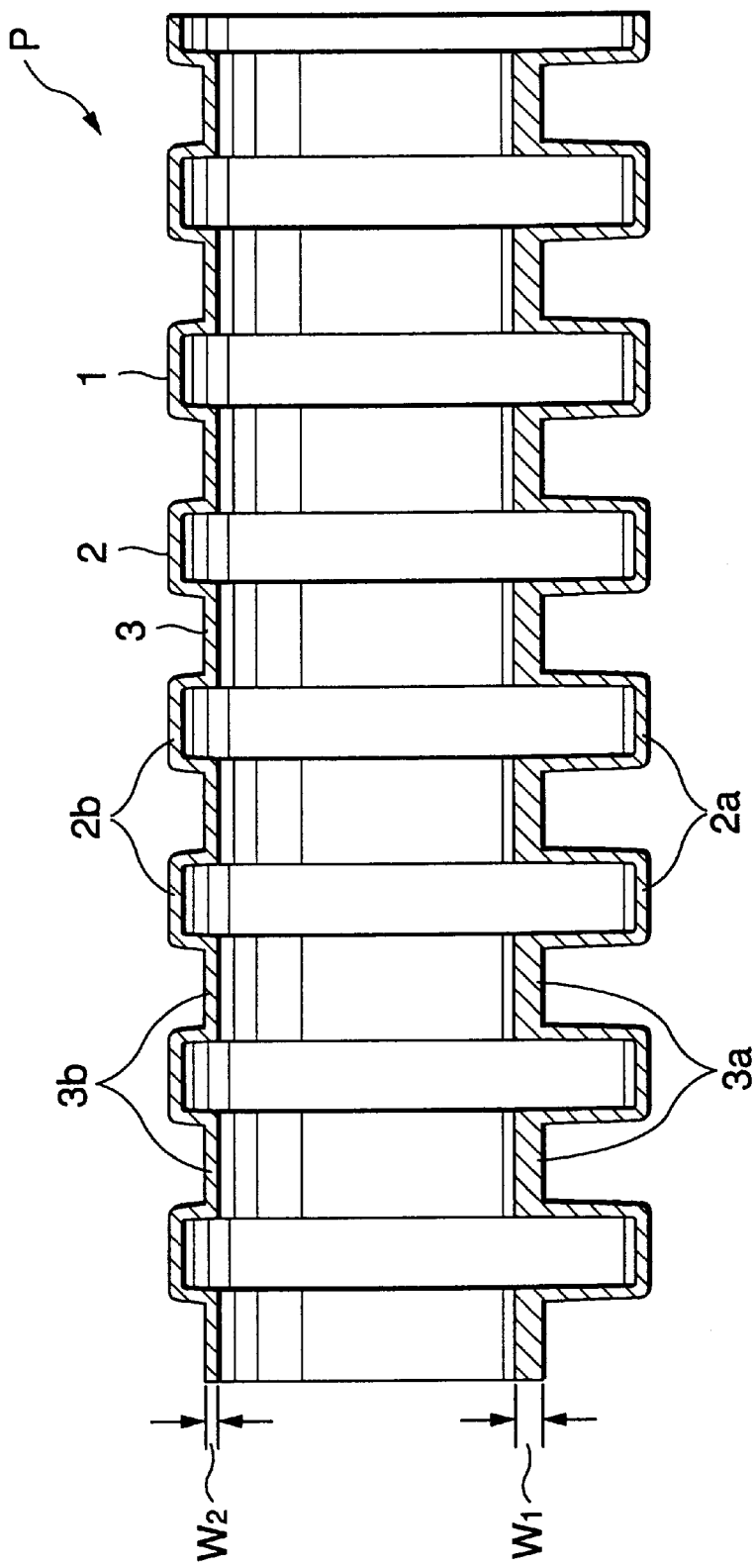

SYNTHETIC RESIN PIPE

BACKGROUND OF THE INVENTION

1. Field of the Invention

The present invention generally relates to a synthetic resin pipe and, more particularly, to a synthetic resin pipe buried in the ground, or used inside or outside a building on the ground, or as a cable protecting pipe for protecting various types of wires and pipes

2. Background Description

Corrugated piping systems are generally known. These corrugated piping systems are typically formed of synthetic resin and include a pipe wall formed in an annularly or spirally uneven or corrugated shape. These corrugated piping systems are widely used as a cable protection pipe or a drainage pipe.

The conventional synthetic corrugated resin pipes have several drawbacks which are difficult to overcome. First, the stability of the pipes are poor when the synthetic corrugated resin pipes are plumbed. This is because the shape of the pipe is a circularly corrugated shape. Second, because of the circular shape of the synthetic corrugated resin pipes, it is difficult to arrange two or more such pipes in parallel to each other in their mutually adjoining positions. Because of this arrangement difficultly, when the pies are arranged under the ground dirt, sand and other debris easily enters between the respective pipes thus disturbing the straightness of the pipes. This, in turn, increases the insertion resistance when cables, such as electrical wires, are inserted through the pipes. Also, the resistance of a fluid may also easily increase because of the arrangement of the pipes.

Piping systems have been developed to solve the above problems of conventional corrugated pipes having circularly and unevenly corrugated shapes. FIGS. 11 to 13 show a pipe $P_1$ having a cylindrical portion 2 having a substantially square cross section and a cylindrical portion 3 having a substantially circular cross section arranged alternately in the axial direction of the pipe.

Specifically, FIG. 11 shows the pipe $P_1$, where the cylindrical portion 3 has a circular cross section of uniform thickness. Also, the cylindrical portion 2 has a square cross section having side portions 2b and a corner portions 2a, where the side portions 2b have a thicker cross section than the corner portions 2a. As better seen in FIGS. 12 and 13, the corner portions 2a have an intermediate portion A and corner portions B, B, where the two corner sections B, B are excessively decreased in thickness as compared to the intermediate portion A. As important, both thicknesses A, B are excessively decreased in thickness as compared to the thickness C of the central portions 2b. Because the corner sections B, B are excessively decreased in thickness, the corner sections B, B are extremely poor in pressure deformation resistance when compared with the remaining cylindrical portion 2, 3 and are thus easy to break.

SUMMARY OF THE INVENTION

It is therefore an object of the present invention to provide a pipe having reinforced corner sections in order to increase pressure deformation resistance, thereby preventing breakage of the corner sections.

It is a further object of the present invention to provide an improved pipe that can be easily produced, without a decrease in productivity efficiency.

According to the invention, there is provided a synthetic resin pipe P having a side wall 1 comprising a plurality of substantially square portions and a plurality of substantially circular portions disposed alternately in the axial direction of the pipe P. The substantially square portions include side portions and corner portions. The thickness of the substantially circular portions are uneven in the circumferential direction. This may include, amongst other shapes, (i) a true-circle-shaped inner peripheral edge and an outer peripheral edge projecting outwardly, (ii) true-circle-shaped outer peripheral edge and an inner peripheral edge projecting inwardly, or (iii) an outer peripheral edge projecting outwardly and an inner peripheral edge projecting inwardly.

A thickness $w_1$ of portions of the circular portions corresponding to the corner portions of the square portions are thicker than a thickness $w_2$ of portions of the circular portions corresponding to the side portions of the square portions. In embodiments, the thickness $w_1$ is set approximately 20% to 60%, and more preferably 25% to 50%, larger than the thickness $w_2$. The thickness $w_1$ extend in the angle direction of 45°, 135°, 225° and 315°, whereas the thickness $w_2$ extend in the angle direction of 0°, 90°, 180° and 270°.

A resin extrusion opening formed in a resin extruding device is also provided for extruding a resin tube for forming the pipe. In preferred embodiments, the resin extrusion includes a true-circle-shape outer peripheral edge and an inner peripheral edge projecting inwardly in the peripheral direction of the resin extrusion opening. The resin extrusion opening may also be formed in other uneven shapes. A resin extrusion clearance $t_1$ formed in the resin extrusion opening is set larger than a resin extrusion clearance $t_2$ also formed in the resin extrusion opening. In preferred embodiments, the resin extrusion clearance $t_1$ is set wider than the resin extrusion clearance $t_2$ by approximately 5% to 30%.

A parison (resin) tube T is extruded from the resin extrusion opening. In one embodiment, the parison tube T incudes an outer peripheral surface having a substantially true-circle shape, while the inner peripheral surface has projecting portions. Accordingly, the parison tube T do not have a uniform thickness in the peripheral direction. In embodiments, the thickness of the parison tube T may vary in the range of 20% to 60%.

The synthetic resin material of the pipe P is preferably a polyolefin system resin such as polyethylene and polypropylene. Polyvinyl chloride or other such materials that provides weatherproofing, durability and environmentally sound properties can also be used. The synthetic resin material must have sufficient strength and/or thickness and/or sufficient pressure deformation resistance to withstand external pressures applied to the pipe wall 1.

BRIEF DESCRIPTION OF THE DRAWINGS

The foregoing and other objects, aspects and advantages will be better understood from the following detailed description of a preferred embodiment of the invention with reference to the drawings, in which:

FIG. 6 is a section view taken along the line VI—VI of FIG. 3;

DETAILED DESCRIPTION OF A PREFERRED EMBODIMENT OF THE INVENTION

Figure 1:
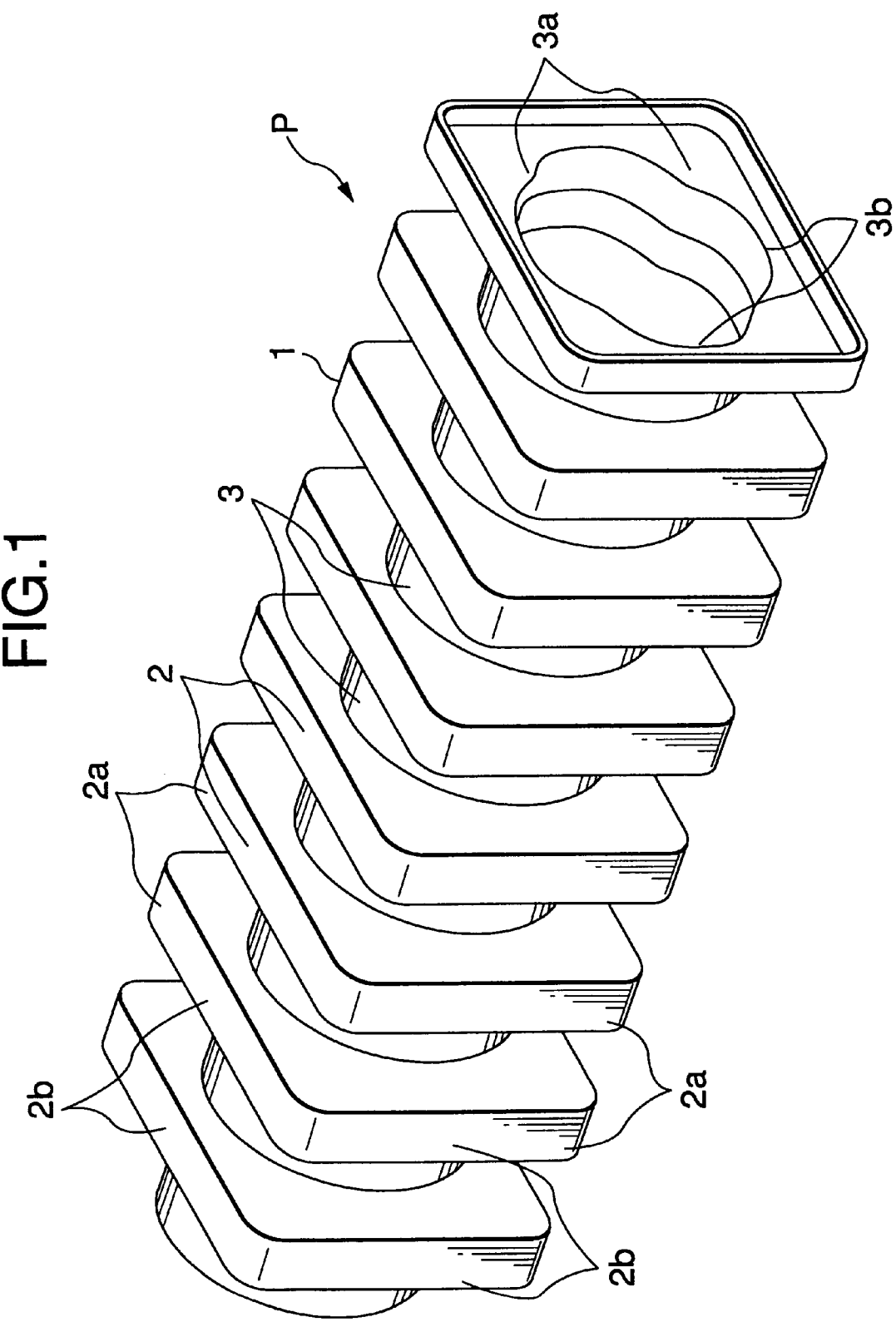
FIG. 1 is perspective view of a first embodiment of the invention.

Referring now to the drawings, and more particularly to FIG. 1, there is shown a synthetic resin pipe P having a side wall 1. The side wall comprises a plurality of substantially square portions 2 and a plurality of substantially circular portions 3. The plurality of substantially square portions 2 and the plurality of substantially circular portions 3 are disposed alternately in the axial direction of the pipe P to form the pipe of the present invention. The plurality of substantially square portions 2 include side portions 2b and corner portions 2a, while the substantially circular portions 3 include portions 3a, 3b. The portions 3b correspond to the side portions 2b of the substantially square portions 2, whereas the portions 3a correspond to the corner portions 2a of the substantially square portions 2.

Further, FIG. 1 shows the thickness of the substantially circular portions 3 being uneven in the circumferential direction. That is, the thickness of portions 3a is larger than the thickness of the portions 3b.

Figure 2:
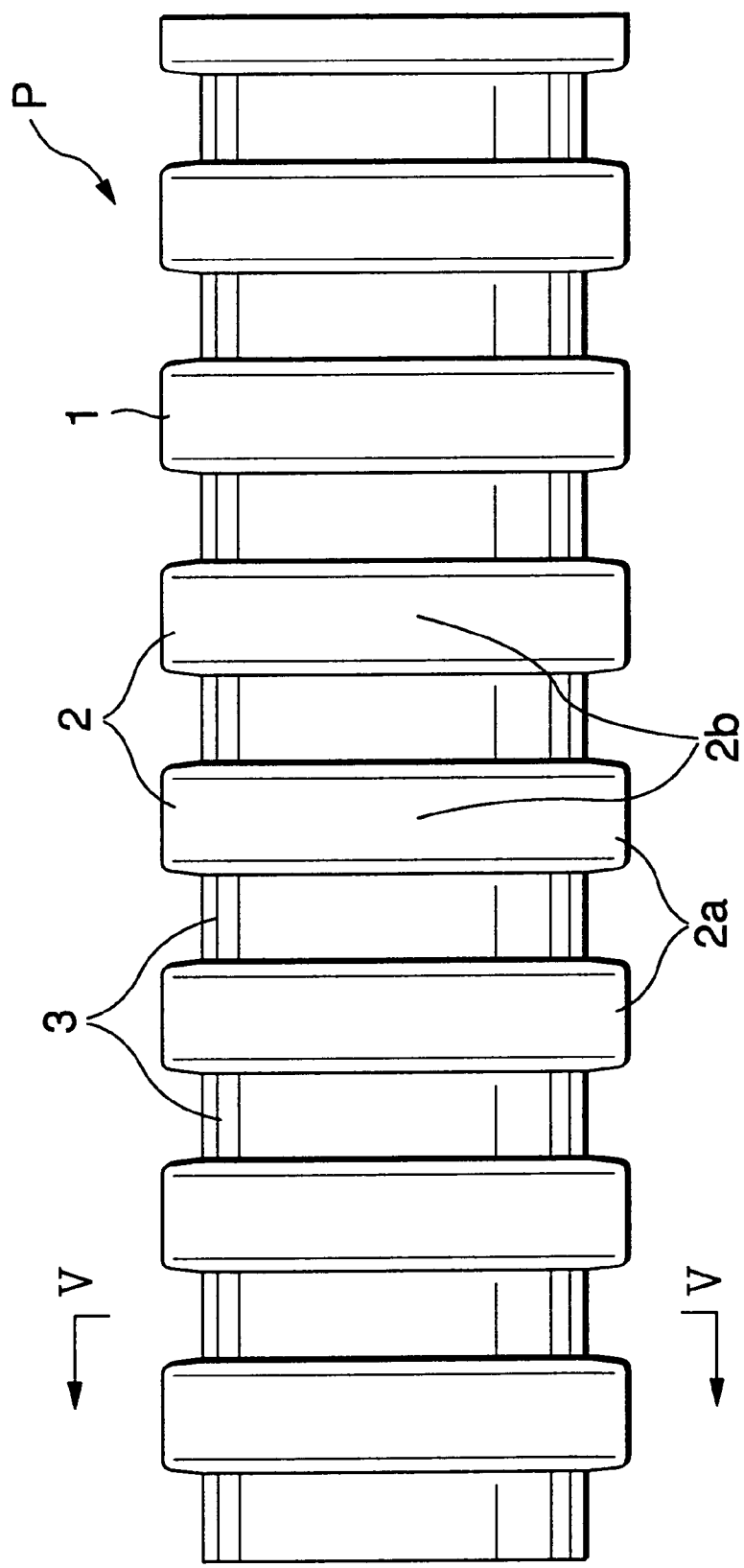
FIG. 2 is a front view of the first embodiment.
Figure 3:
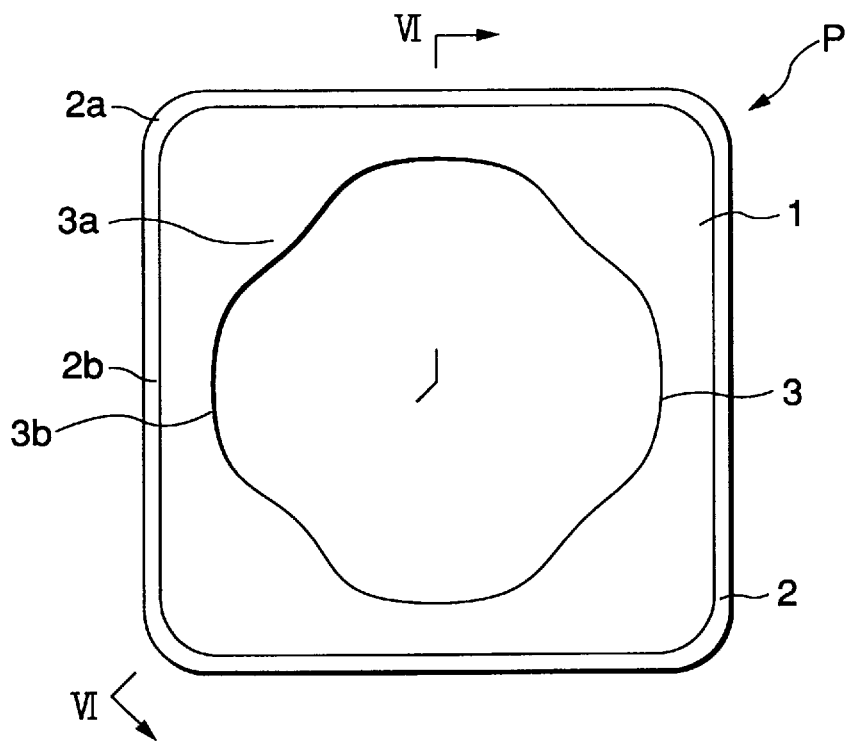
FIG. 3 is a right side view of the first embodiment.
Figure 4:
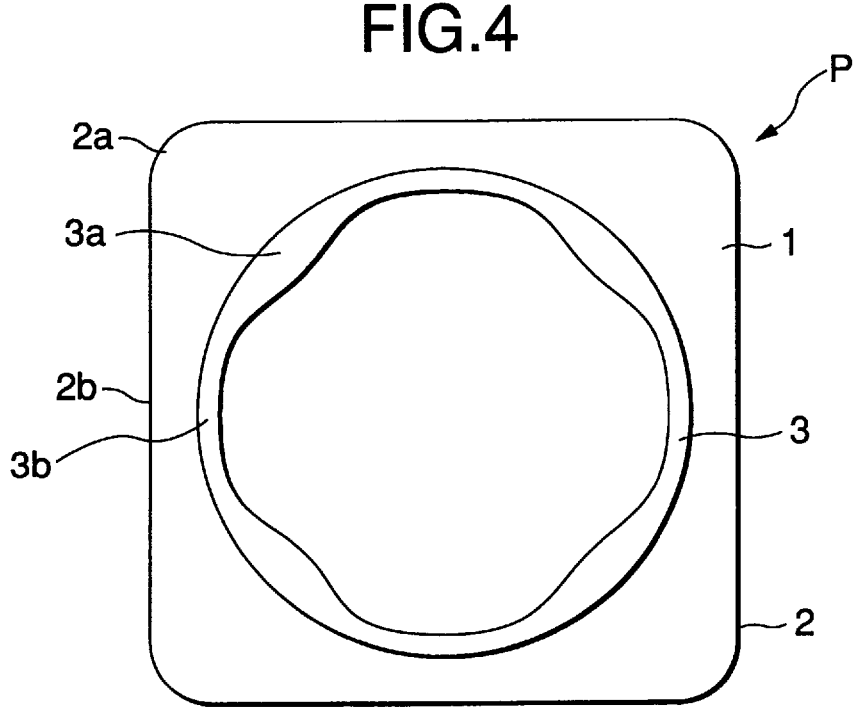
FIG. 4 is a left side view of the first embodiment.

FIG. 2 shows a front view of the pipe P. As described with reference to FIG. 1, the pipe P incudes a side wall 1 and a plurality of alternating substantially square portions 2 and substantially circular portions 3. The plurality of substantially square portions 2 include side portions 2b and corner portions 2a. In preferred embodiments, the pipe 1 is manufactured in segments for easy installation, where one end of the pipe P comprises the substantially square portion 2 and the other end of the pipe P comprises the substantially circular portion 3. However, other arrangements of substantially square portions 2 and substantially circular cylindrical portions 3 are contemplated for use with the present invention, FIG. 3 shows a right side view of the present invention and FIG. 4 shows a left side view of the present invention. As shown in FIGS. 3 and 4, the portions 3b correspond to the side portions 2b of the substantially square portions 2, whereas the portions 3a correspond to the corner portions 2a of the substantially square portions 2. The thickness of portions 3a is larger than the thickness of the portions 3b.

Figure 5:
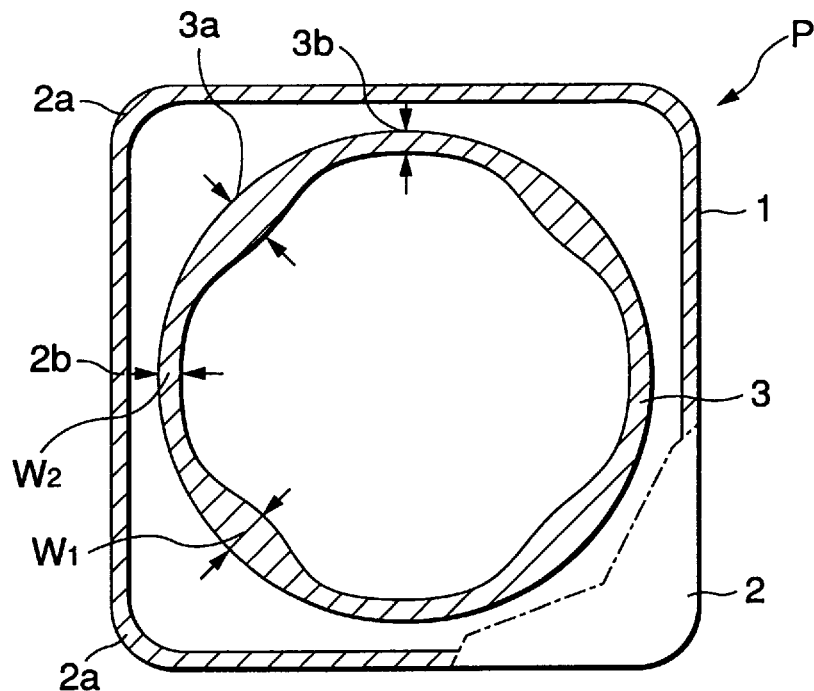
FIG. 5 is an enlarged section view taken along the line V—V of FIG. 2.

FIG. 5 is an enlarged section view taken along the line V—V of FIG. 2 and shows a detailed view of the thickness of the various portions of the pipe P. Specifically, a thickness $w_1$ of the portions 3a of the circular portions 3 corresponding to the corner portions 2a of the square portions 2 is thicker than a thickness $w_2$ of the portions 3b of the circular portions 3 corresponding to the side portions 2b of the square portions 2. Thus, the thicknesses of the circular portions 3 is uneven. In preferred embodiments, the thickness $w_1$ is approximately 20% to 60%, and more preferably 25% to 50%, larger than the thickness $w_2$. However, other thickness ratios between $w_1$ and $w_2$ are also contemplated for use with the present invention.

In preferred embodiments, the thickness $w_1$ of the portions 3a extend in the angle direction of 45°, 135°, 225° and 315°, whereas the thickness $w_2$ of the portions 3b extend in the angle direction of 0°, 90°, 180° and 270°. The thickness of the corners 2a and the thickness of side portions 2b are substantially the same thickness.

FIG. 6 shows a section view taken along the line VI—VI of FIG. 3. As clearly shown in FIG. 6, the thickness of $w_1$ is larger than the thickness $w_2$.

Figure 7:
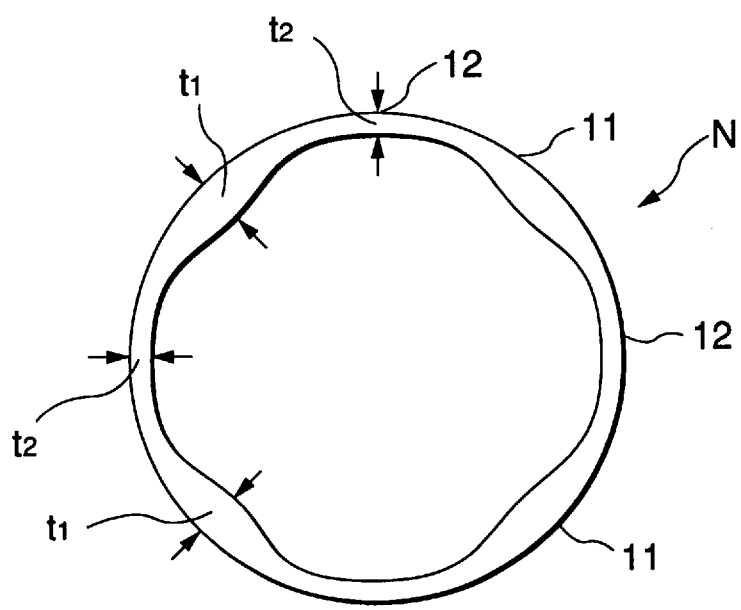
FIG. 7 is front view of a resin extrusion opening formed in a resin extruding device.

FIG. 7 shows a front view of a resin extrusion opening formed in a resin extruding device. The resin extrusion opening of FIG. 7 includes a true-circle-shape outer peripheral edge and an inner peripheral edge projecting inwardly in the peripheral direction of the resin extrusion opening N, thereby forming portions 11, 12. Specifically, the portions 11 are spaced at substantially regular intervals from each other in the peripheral direction of the resin extrusion opening N. Intermediate portions 12 are positioned between the portions 11 and are also provided at substantially regular intervals from each other in the peripheral direction of the resin extrusion opening N. A resin extrusion clearance $t_1$ located at the portions 11 is larger than a resin extrusion clearance $t_2$ located at the respective intermediate portions 12. In preferred embodiments, the resin extrusion clearance $t_1$ is approximately 5% to 30% wider than the resin extrusion clearance $t_2$.

Figure 9:
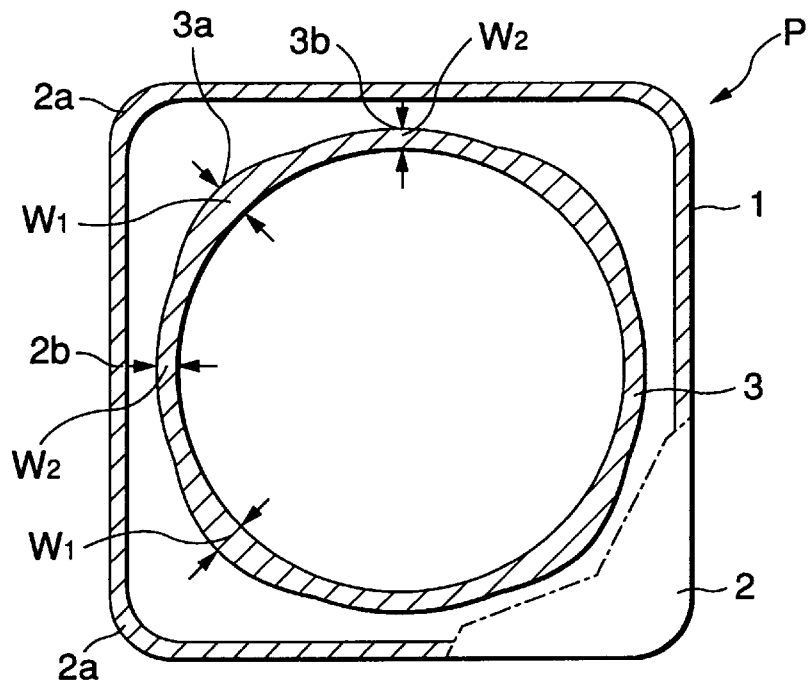
FIG. 9 is a section view of a second embodiment of a pipe according to the invention, showing a portion which corresponds to the portion of the first embodiment shown in FIG. 5.

Although the shape of the resin extrusion opening N is not limited to that shown in FIG. 7, even if the shape as shown in FIG. 7 is used, in a mould for shaping the pipe P, especially in the caterpillar type mould for determining the outer shape of the pipe in a blow molding means, if the inner peripheral surface of a short cylinder portion of the mould for forming the circular cylinder portions 3 of the pipe is made to have an uneven shape having outwardly protruded protrusions in the peripheral direction, the substantially circular portions 3 of the pipe P may have a substantially true-circle-shape inner surface and an outer peripheral surface having uneven portions (FIG. 9). Alternatively, the substantially circular portions 3 of the pipe P may also have unevenly shaped (varying in an inwardly and outwardly uneven shape) inner and the outer peripheral surfaces in the peripheral direction thereof. That is, the circular portions 3 of the pipe P may be structured such that it has uneven portions respectively formed on both the inner and the outer sides (see FIG. 10). In embodiments, other resin extrusion openings N are provided for use with the present invention so long the resin extrusion openings N provide the advantages described herein.

Figure 8:
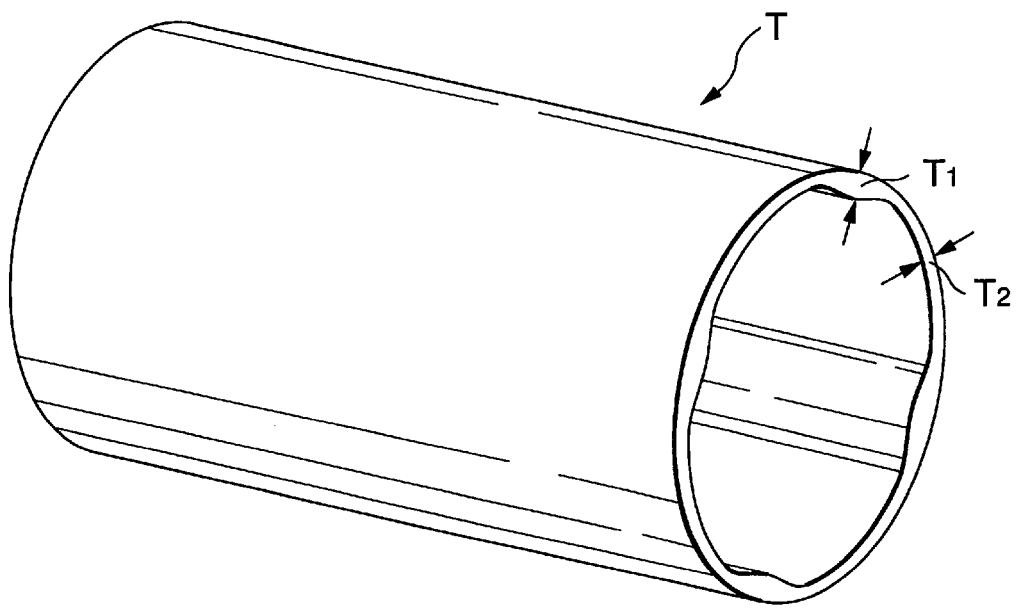
FIG. 8 Is a perspective view of a parison tube extruded from a resin extrusion opening.
Figure 11:
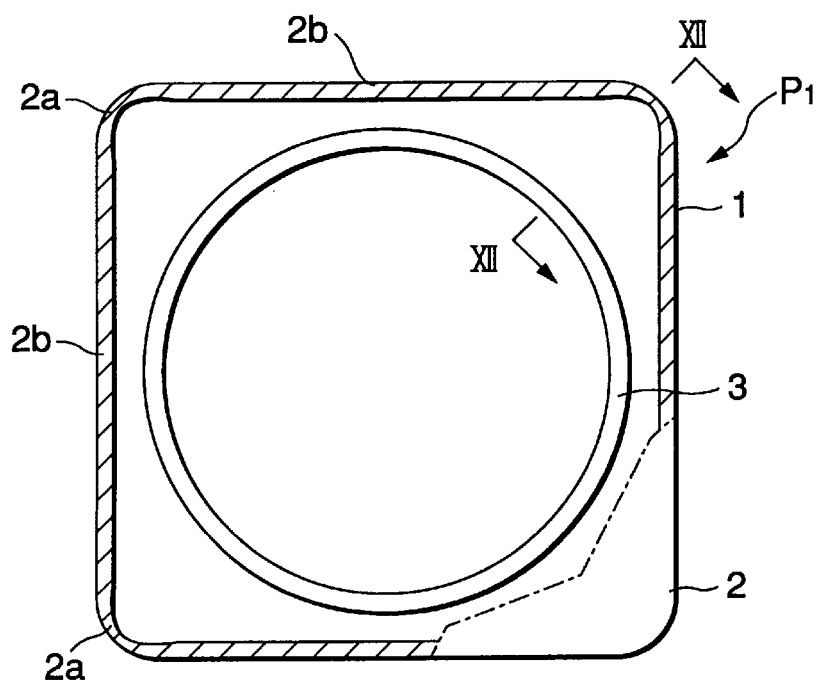
FIG. 11 is a side view of a comparison pipe, in which the square-section cylindrical portion of the comparison pipe is broken in part.

FIG. 8 shows a perspective view of a parison (resin) tube T extruded from the resin extrusion opening N of FIG. 7. As shown in FIG. 8, the parison tube T (extruded from the resin extrusion opening N) includes an outer peripheral surface having a substantially true-circle-shape, while the inner peripheral surface has inwardly projecting portions. Accordingly, the parison tube T do not have a uniform thickness, $T_1$, $T_2$, in the peripheral direction. According to this configuration, the respective corner portion 2a of the substantially square portions 2 are molded by the respective large thickness portions $T_1$ of the parison T, and the side portions 2b of the substantially square portions 2 are molded by the small thickness portions $T_2$ of the parison tube T. In embodiments, the thickness of the parison tube T may vary in the range of 20% to 60%.

FIG. 9 is a section view of a second embodiment of a pipe according to the invention showing a portion which corresponds to the portion or the first embodiment shown of FIG. 5. In FIG. 9, like FIG. 5, the thickness $w_1$ of the portions 3a of the circular portions 3 corresponding to the corner portions 2a of the square portions 2 is thicker than a thickness $w_2$ of the portions 3b of the circular portions 3 corresponding to the side portions 2b of the square portions 2. However, by changing the inner surface shape of the mould of the extrusion device, the substantially circular portions 3 have an inner surface that is substantially a true-circle-shape and an outer peripheral surface having an uneven portion. That is, a true-circle shape inner peripheral edge and an outer peripheral edge 3a projecting outwardly in the peripheral direction is provided. The outwardly projecting peripheral edge 3a includes the thickness $w_1$ which is larger than the thickness $w_2$ of the portions 3b. The pipe P of FIG. 9 may be used similarly to the conventional pipe because the inner surface is circular.

Figure 10:
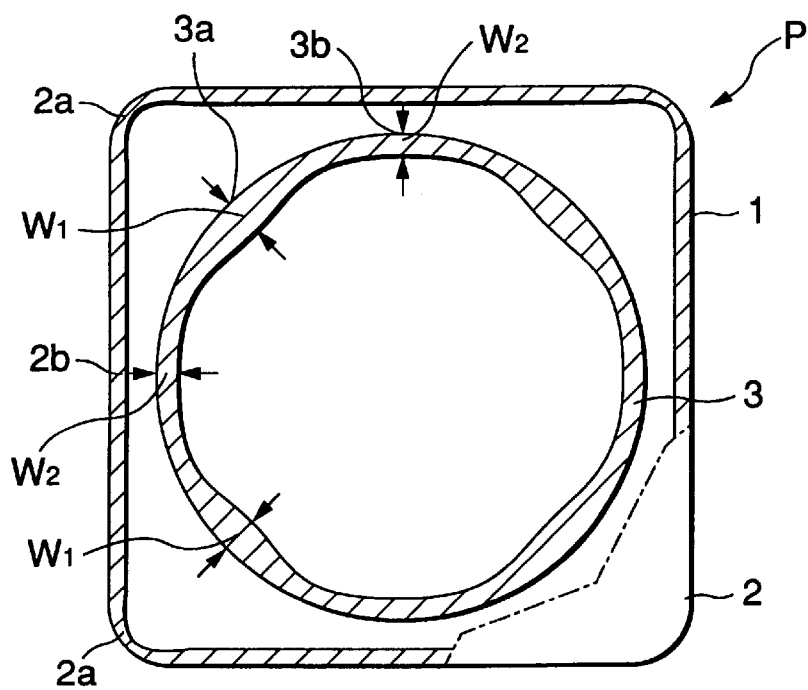
FIG. 10 is a section view of a third embodiment of a pipe according to the invention, showing a portion which corresponds to the portion of the first embodiment shown in FIG. 5.
Figure 12:
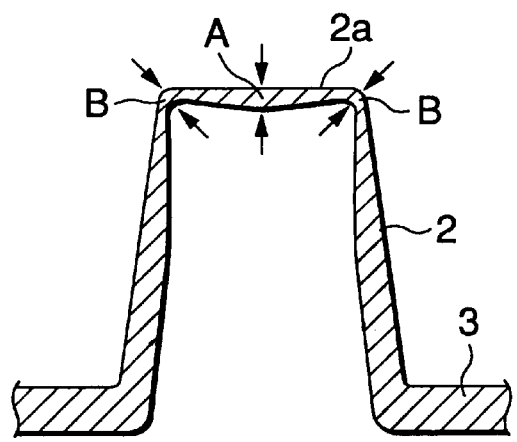
FIG. 12 is an enlarged section view taken along the line XII—XII of FIG. 11.
Figure 13:
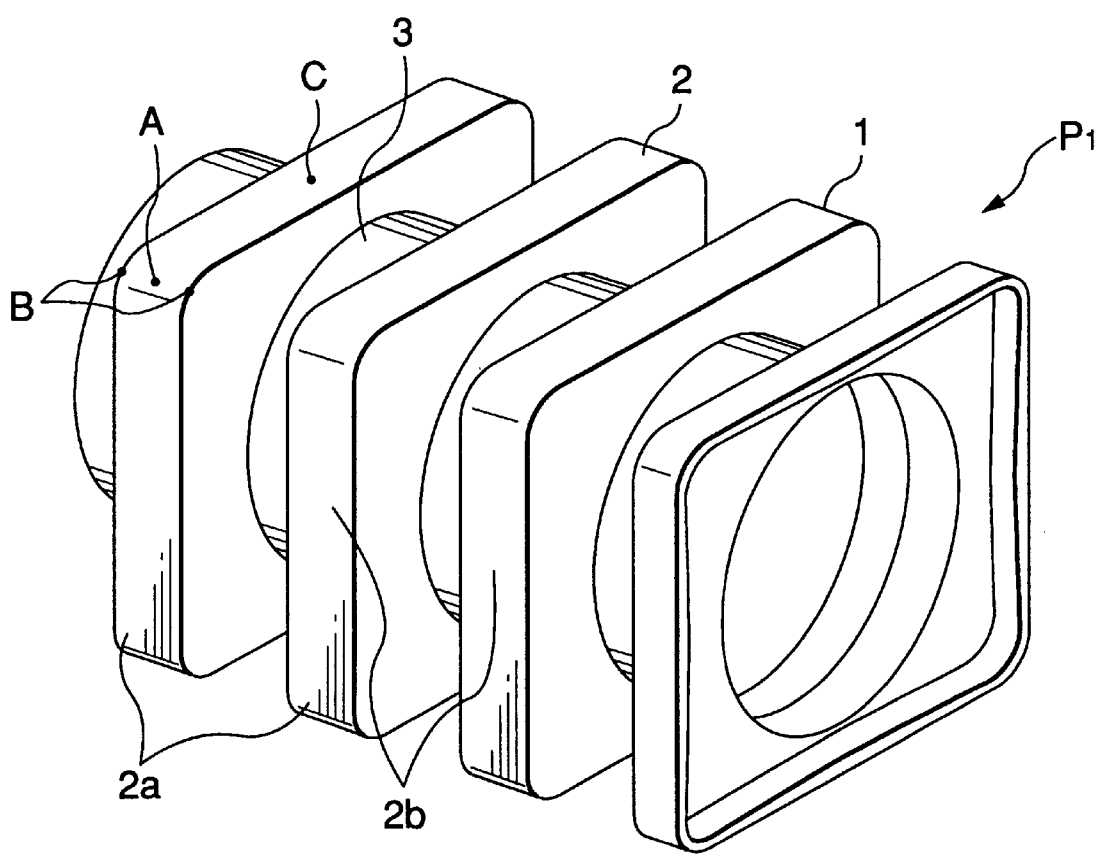
FIG. 13 is a perspective view of the comparison pipe.

FIG. 10 shows a section view of a third embodiment of a pipe according to the present invention showing a portion which corresponds to the portion of the first embodiment shown of FIG. 5. In this example, the substantially circular portions 3 have both unevenly shaped (varying in an inwardly and outwardly uneven shape) inner and outer peripheral surfaces in the peripheral direction. This is because the shape of the inner surface of the mould of the extrusion device may be formed unevenly to a slight degree in the peripheral direction. Thus, the circular portions 3 can be structured to have uneven portions respectively formed on both the inner and the outer sides thereof, where in some instances the uneven portions of the inner and the outer surfaces of the circular portions 3 are not particularly noticeable.

As further seen in FIG. 10, the corner portions 2a of the square portions 2 are slightly smaller in thickness than the side portions 2b of the square portions 2. In other words, in the pipe P, constructed according to the present invention, it is not always necessary that the thickness of the corner portions 2a be equal to the side portions 2b, but the corner portions 2a may be slightly thinner, provided that the thickness of the corner portions 2b can maintain a proper strength and pressure deformation resistance.

In preferred embodiments, the synthetic resin material forming the pipe P is a polyolefin system resin such as polyethylene, polypropylene or other such material that provides weatherproofing, durability and environmentally sound properties. However, other synthetic resin materials such as polyvinyl chloride or the like can also be used selectively depending on the particular use of the present invention. Accordingly, when the pipe P is used underground, it must have sufficient strength and/or thickness and/or sufficient pressure deformation resistance to withstand external pressures applied to the pipe wall 1. Also, the hardness of the synthetic resin material or rubber material used to mold the pipe P may be selected arbitrarily according to the (i) size of a pipe to be manufactured, (ii) location where the pipe P is being used and (iii) various other considerations.

Experimental Results

Two pipes were molded and the actual dimensions of the pipes were measured. The first pipe was molded when the clearances $t_1$ and $t_2$ of the resin extrusion opening N shown in FIG. 7 are the same over the whole periphery of the resin extrusion opening N. The second pipe was molded under the condition that the clearances $t_1$ and $t_2$ of the resin extrusion opening N varies.

Table 1 shows actual measurement values obtained by having actually measured the thicknesses A, B, C.

TABLE 1

(Unit of numerals is mm)

| Pipe Size (Inside diameter of circular-section cylindrical portion) | 50 | 81 | 100 |
|---|---|---|---|
| Thickness variation quantity 0 | $t_1 = 4.25$ $t_2 = 4.25$ | $t_1 = 5.0$ $t_2 = 5.0$ | $t_1 = 5.25$ $t_2 = 5.25$ |
| Thickness A of corner intermediate portion | 0.7 | 1.0 | 1.2 |
| Thickness B of corner portion two corner sections | 0.4 | 0.7 | 0.7 |
| Thickness C of sides central portions | 1.9 | 3.0 | 3.6 |
| Thickness variation quantity 0.5 | $t_1 = 4.75$ $t_2 = 4.25$ | $t_1 = 5.5$ $t_2 = 5.0$ | $t_1 = 5.75$ $t_2 = 5.25$ |
| Thickness A of corner intermediate portion | 1.3 | 1.2 | 1.4 |
| Thickness B of corner portion two corner sections | 1.0 | 1.0 | 0.9 |
| Thickness C of sides central portions | 2.0 | 3.15 | 3.5 |
| Thickness variation quantity 1.1 | | | $t_1=6.35$ $t_2=5.25$ |
| Thickness A of corner intermediate portion | — | — | 1.75 |
| Thickness B of corner portion two corner sections | — | — | 1.3 |
| Thickness C of sides central portions | — | — | 3.5 |

Table 2 shows the results of the measurements of the pipe molded on the basis of the concept of the present invention described above.

TABLE 2

| Size | Specimen No. | Circular-section cylindrical portion | | Large thickness percentage (%) |
|---|---|---|---|---|
| | | Small thickness portion | Large thickness portion | |
| φ50 | 50-1 | 1.73 | 2.46 | 42.1 |
| | 50-2 | 1.70 | 2.54 | 49.5 |
| | 50-3 | 1.75 | 2.55 | 46.0 |
| φ80 | 80-1 | 2.54 | 3.67 | 44.3 |
| | 80-2 | 2.57 | 3.80 | 47.8 |
| | 80-3 | 2.53 | 3.93 | 55.1 |
| | 80-4 | 2.61 | 3.94 | 51.3 |
| | 80-5 | 2.67 | 4.00 | 49.6 |
| | 80-6 | 2.80 | 4.19 | 49.6 |
| φ100 | 100-1 | 2.89 | 3.97 | 37.5 |
| | 100-2 | 2.80 | 4.14 | 48.2 |
| φ100 Large thickness type | 100-3 | 4.08 | 5.08 | 24.5 |
| | 100-4 | 4.05 | 5.06 | 24.9 |
| | 100-5 | 4.11 | 5.13 | 24.8 |

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A pipe including a pipe wall, the pipe comprising:
   a plurality of substantially square sections, the plurality of substantially square sections including side portions and corner portions; and
   a plurality of substantially circular sections, the substantially square sections and the substantially circular sections alternating with respect to another in an axial direction of the pipe, a thickness of the substantially circular sections varies in a circumferential direction of the pipe, wherein the thickness of the substantially circular sections corresponding to the corner portions of the substantially square sections is larger than the thickness of the substantially circular sections corresponding to the side portions of the substantially square portions.

2. The pipe of claim 1, further comprising:

a first end including the substantially square sections; and a second end including the substantially circular sections.

3. The pipe of claim 1, further comprising:

a first end including one of the substantially square sections and the substantially circular sections; and a second end including one of the substantially square sections and the substantially circular sections.

4. The pipe of claim 1, wherein the thickness of the substantially circular sections corresponding to the corner portions of the substantially square sections is approximately 20% to 60% larger than the thickness of the substantially circular sections corresponding to the side portions of the substantially square portions.

5. The pipe of claim 4, wherein the thickness of the substantially circular sections corresponding to the corner portions of the substantially square sections is approximately 25% to 50% larger than the thickness of the substantially circular sections corresponding to the side portions of the substantially square portions.

6. The pipe of claim 1, wherein:

the thickness of the substantially circular sections corresponding to the corner portions of the substantially square sections extend in an angle direction of 45°, 135°, 225° and 315°, and the thickness of the substantially circular sections corresponding to the side portions of the square portions extend in an angle direction of 0°, 90°, 180° and 270°.

7. The pipe of claim 1, wherein a thickness of the side portions and a thickness of the corner portions of the substantially square sections are substantially the same thickness.

8. The pipe of claim 1, wherein a thickness of the side portions of the substantially square sections is different from a thickness of the corner portions of the substantially square sections.

9. The pipe of claim 1, wherein:

the pipe comprises a synthetic resin material, and the synthetic resin material is a polyolefin system resin.

10. The pipe of claim 1, wherein:

an inner peripheral surface of the substantially circular sections is substantially a true-circle-shape, and an outer peripheral surface of the substantially circular sections includes outwardly projecting projections.

11. The pipe of claim 1, wherein:

an inner peripheral surface of the substantially circular sections includes inwardly projecting projections, and an outer peripheral surface of the substantially circular sections is substantially a true-circle-shape.

12. The pipe of claim 1, wherein:

an inner peripheral surface of the substantially circular sections includes inwardly projecting projections, and an outer peripheral surface of the substantially circular sections includes outwardly projecting projections.

\* \* \* \* \*